United States Patent

Tonelli et al.

[11] Patent Number: 5,997,745
[45] Date of Patent: Dec. 7, 1999

[54] METHOD FOR PRODUCING HIGH PURITY WATER USING TRIPLE PASS REVERSE OSMOSIS (TPRO)

[75] Inventors: Anthony A. Tonelli; Ake Deutschmann; Susan L Wesno, all of Burlington, Canada

[73] Assignee: Zenon Environmental Inc., Burlington, Canada

[21] Appl. No.: 09/056,962

[22] Filed: Apr. 8, 1998

[51] Int. Cl.[6] ................................................. B01D 61/00
[52] U.S. Cl. ........................ 210/652; 210/85; 210/96.2; 210/180; 210/639; 210/195.2; 210/746; 95/51
[58] Field of Search ................................. 210/651, 652, 210/180, 641, 195.2, 257.2, 96.2, 740, 746, 85, 639; 324/439, 438, 440; 95/51

[56] References Cited

U.S. PATENT DOCUMENTS

| | | |
|---|---|---|
| 3,639,231 | 2/1972 | Bresler . |
| 3,774,763 | 11/1973 | Yall et al. ................................. 210/96 |
| 3,776,842 | 12/1973 | Grimme, Jr. . |
| 3,823,086 | 7/1974 | Schmidt . |
| 3,870,033 | 3/1975 | Faylor et al. ........................ 126/360 R |
| 4,014,787 | 3/1977 | Shorr . |
| 4,046,685 | 9/1977 | Bray . |
| 4,115,274 | 9/1978 | Boddeker et al. . |
| 4,160,727 | 7/1979 | Harris . |
| 4,188,291 | 2/1980 | Anderson . |
| 4,243,523 | 1/1981 | Pelmulder ............................... 210/652 |
| 4,255,263 | 3/1981 | Galimi et al. . |
| 4,261,833 | 4/1981 | Pohl et al. .............................. 210/639 |
| 4,277,336 | 7/1981 | Henschel, Jr. .......................... 210/167 |
| 4,289,617 | 9/1981 | Davis ..................................... 210/109 |
| 4,313,830 | 2/1982 | Tulin et al. ............................. 210/639 |
| 4,332,685 | 6/1982 | Nowlin et al. .......................... 210/638 |
| 4,392,959 | 7/1983 | Coillet ..................................... 210/638 |
| 4,434,057 | 2/1984 | Marquardt ............................... 210/638 |
| 4,495,067 | 1/1985 | Klein et al. ............................... 210/87 |
| 4,574,049 | 3/1986 | Pittner ..................................... 210/639 |
| 4,587,518 | 5/1986 | King ......................................... 210/85 |
| 4,787,980 | 11/1988 | Ackermann et al. .................. 210/638 |
| 4,808,287 | 2/1989 | Hark ..................................... 204/182.5 |
| 4,830,757 | 5/1989 | Lynch et al. ............................. 210/742 |
| 4,879,041 | 11/1989 | Kurokawa et al. ..................... 210/640 |
| 4,897,091 | 1/1990 | Pasternak et al. .......................... 55/16 |
| 5,078,755 | 1/1992 | Tozawa et al. ............................. 55/16 |
| 5,106,754 | 4/1992 | Steele et al. ............................. 436/146 |
| 5,116,507 | 5/1992 | Ebbins et al. ........................... 210/639 |
| 5,156,739 | 10/1992 | Dawson et al. ...................... 210/321.8 |
| 5,250,183 | 10/1993 | Sawada et al. ........................ 210/652 |
| 5,254,143 | 10/1993 | Anazawa et al. .......................... 95/46 |
| 5,306,427 | 4/1994 | Xu ........................................... 210/640 |
| 5,338,456 | 8/1994 | Stivers ..................................... 210/652 |
| 5,413,763 | 5/1995 | Jeffers ....................................... 422/80 |
| 5,614,099 | 3/1997 | Hirose et al. ........................... 210/653 |
| 5,651,894 | 7/1997 | Boyce et al. ............................ 210/652 |
| 5,670,053 | 9/1997 | Collentro et al. ....................... 210/652 |
| 5,766,479 | 6/1998 | Collentro et al. ....................... 210/639 |
| 5,895,565 | 4/1999 | Steinnger et al. ........................ 210/85 |

FOREIGN PATENT DOCUMENTS

| | | |
|---|---|---|
| 22802 | 6/1988 | Japan . |
| 422490 | 5/1990 | Japan . |
| 4176303 | 6/1992 | Japan . |

OTHER PUBLICATIONS

Tai et al, "Removal of Dissolved Oxygen in Ultrapure Water Production Using Microporous Membrane Modules", J. Membrane Sci. 37 (1994)99–105.

Primary Examiner—Ana Fortuna
Attorney, Agent, or Firm—Andrew Alexander

[57] ABSTRACT

A method for producing high purity product water using a three pass reverse osmosis system.

17 Claims, 5 Drawing Sheets

METHOD FOR PRODUCING HIGH PURITY WATER USING TRIPLE PASS REVERSE OSMOSIS (TPRO)

CROSS REFERENCE TO RELATED APPLICATION

This application claims the benefit of U.S. Provisional Application No. 60/056,670, filed Aug. 22, 1997.

BACKGROUND OF THE INVENTION

This invention relates to high purity water, and more particularly it relates to production of high purity water using reverse osmosis.

In producing a high purity water product using reverse osmosis membranes, it is difficult to reject gases such as carbon dioxide and/or ammonia. The carbon dioxide and ammonia gas pass through the reverse osmosis system and re-establish an equilibrium in the product water. This, of course, adversely affects the product water quality, e.g., resistivity.

Many processes have been suggested to provide high purity water. For example, U.S. Pat. No. 5,178,766 suggests the use of a composite semipermeable membrane comprising a microporous substrate; and a cross-linked polyamide-based ultra-thin membrane superposed on the microporous substrate, the ultra-thin membrane having covalently bonded quaternary nitrogen atoms. When such a membrane, i.e., cross-linked polyamide-based composite semipermeable membrane, is used, it is suggested that a double pass reverse osmosis system is sufficient to produce high purity water. That is, a regenerative ion-exchanger normally used may be eliminated.

U.S. Pat. No. 5,670,053 discloses a process for purifying water including removing cations, anions and carbon dioxide and/or ammonia from water feed stream to produce high purity water having a resistivity of greater than 1 megohm-cm comprising the steps of providing a water feed stream to be purified. In this system, a gas permeable hydrophobic membrane is provided between a first reverse osmosis system and a second reverse osmosis system for removing carbon dioxide and/or ammonia gas through a gas permeable hydrophobic membrane.

U.S. Pat. No. 5,061,374 discloses an improved deionized water treatment system and method that consists of using a first and second water treatment train wherein the second train improves water quality by reducing particulate and total organic carbon by means of a reverse osmosis membrane assembly. The final pure water has particulate sizes less than one micron and a total organic carbon measure of less than one part per billion.

U.S. Pat. No. 4,347,704 discloses that the costs of water used in a fossil fuel fired power station are reduced by a process which employs multiple reverse osmosis stages. The process also employs station waste heat to concentrate solid waste material to facilitate disposal thereof. In this process, concentrate from a first reverse osmosis is directed to a second reverse osmosis and concentrate from the second reverse osmosis is directed to a third reverse osmosis. Steam is used to heat the concentrate from the third reverse osmosis and solid matter is extracted therefrom.

U.S. Pat. No. 4,980,066 discloses an improved membrane separation system which comprises a plurality of discrete membrane separation units, each membrane separation unit comprising at least two membranes and also comprising an inlet for process fluid and optionally an outlet for process fluid. Each membrane separation unit is located within a container for permeate, the container comprising a permeate outlet and wherein the container is such as to enable the membrane separation units to be at least partially immersed in permeate.

U.S. Pat. No. 5,651,894 discloses an ultrapure water purification scheme that incorporates the use of certain reverse osmosis filtration membranes that are especially susceptible to oxidative attack. The scheme employs the combination reducing/metals scavenger/biocidal agent dithiocarbamate as a pretreatment additive to maintain a nonoxidizing environment, to bind contaminant metals to improve their removal from source water, and to reduce microbial content. In addition, the generation of oxidants by cavitation effects is avoided by a reduced pressure retentate recycle. Both measures prevent oxidative attack and fouling of the reverse osmosis membranes.

U.S. Pat. No. 5,128,041 discloses microporous membranes having positive zeta potentials in alkaline pH which are provided by radiation grafting diallyl-dimenthylammonium dimethyl ammonium chloride to the surfaces of a microporous, polyamide membrane using ionizing radiation. The membranes have particular use in microelectronics manufacture where quick rise up times with ultrapure water are required.

Thus, it will be seen that there is a great need for a process which can be tuned to the system, including feedwater and the use of different membranes, and which will consistently produce high resistivity water on a continuous basis, even with changing composition of the feedwater.

SUMMARY OF THE INVENTION

It is an object of this invention to provide an improved process for producing high purity water, for example, having a resistivity of 0.8 megohm-cm or greater.

It is another object of the invention to provide a triple pass reverse osmosis system for production of high purity water.

It is yet another object of this invention to provide an improved process employing three reverse osmosis membranes having a combination of charged and non-charged membranes.

It is yet another object of this invention to provide a system employing three reverse osmosis membranes for producing high quality water with low concentrations of weakly acidic anions, such as silicates and borates.

And it is yet another object of this invention to provide a system employing three reverse osmosis membranes capable of producing high purity water having a resistivity in the range of 10 to 18 megohm-cm.

Yet, it is another object of this invention to provide an improved process employing three reverse osmosis membranes for producing high purity water by utilizing product water resistivity to control pH of feedwater or interpass water in the system.

And yet, it another object of the invention to use a triple pass reverse osmosis system having the pH of the product water monitored to control the pH of the feedwater.

Still yet it is another object of the invention to provide a triple pass reverse osmosis system for producing high purity water using a programmable logic controller to compare high purity water resistivity measurements and control feedwater or interpass pH based on the product water resistivity.

These and other objects will become apparent from a reading of the specification and claims appended hereto.

In accordance with these objects, there is provided a method for producing high purity product water using a three pass reverse osmosis system, the method having the ability to produce water having a resistivity in the range of 10 to 18 megohm-cm. The method comprises the steps of providing a feedwater to be purified, the feedwater preferably having a basic pH. The feedwater is introduced to a high pressure side of a first reverse osmosis membrane module preferably comprising a non-charged membrane, and water is passed through the first reverse osmosis membrane to provide a first retentate and a first permeate, the first permeate maintained at a basic pH. The first permeate is transferred to a high pressure side of a second reverse osmosis membrane module and is further purified by passing at least a portion thereof through the second reverse osmosis membrane to provide a second retentate and a second permeate having a pH of less than 6.2 and resistivity in the range of 0.5 to 2.5 megohm-cm. The second permeate is adjusted to a pH in the range of 6.2 to 8.5 to provide an adjusted second permeate. A third pass reverse osmosis module is provided having a third high pressure side and a third low pressure side, the third pass reverse osmosis module preferably comprising a third pass reverse osmosis membrane selected from a positively charged membrane and a negatively charged membrane. The adjusted second permeate is introduced to the high pressure side of the third pass reverse osmosis module and at least a portion of said adjusted second permeate is passed through said third pass reverse osmosis membrane to permeate high purity product water having a pH in the range of 6.8 to 7.2

DETAILED DESCRIPTION OF THE PREFERRED EMBODIMENTS

Figure 1:
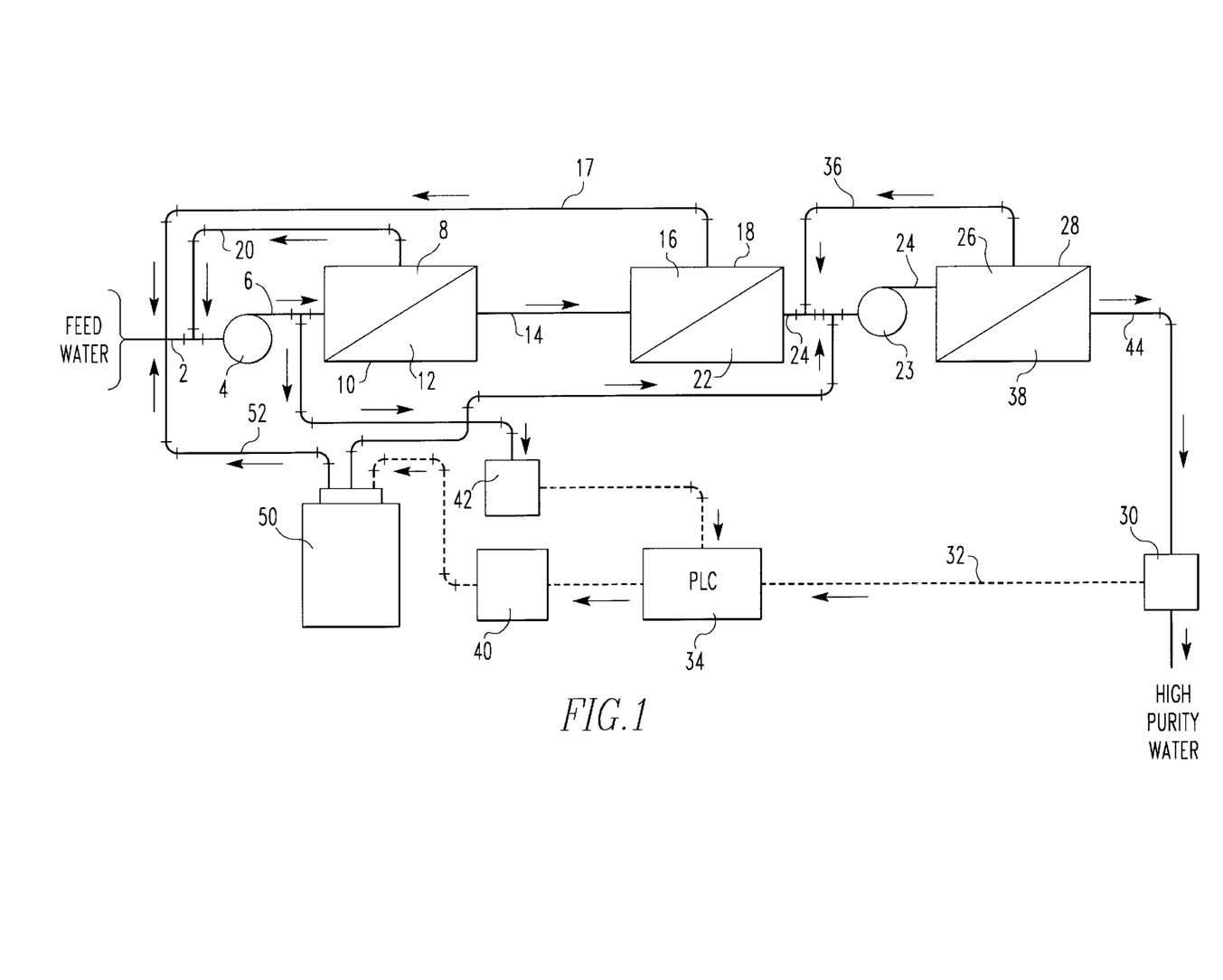
FIG. 1 is a schematic representation of the process of the invention showing a triple pass reverse osmosis and a pH control loop for a triple pass reverse osmosis system for producing high purity water.

In the present invention, referring now to FIG. 1, feedwater is introduced to line 2. Pump 4 transfers feedwater along line 6 to high pressure side 8 of first reverse osmosis unit 10. Prior to being introduced to high pressure side 8, the feedwater can be subjected to a number of pretreatments depending to some extent on the quality of the initial feedwater. Further, prior to entering high pressure side 8, the pH of the feedwater or interpass water may be controlled in response to resistivity of the product water obtained from the system, as will be explained herein. Permeate from low pressure side 12 of reverse osmosis unit 10 is transferred along line 14 to high pressure side 16 of second reverse osmosis unit 18. Retentate from reverse osmosis unit 10 is discarded or removed along line 20 to the feedwater line 2.

Because adjustments may be made to the pH of the feedwater in response to product resistivity, normally there is no need to chemically adjust the permeate emanating from low pressure side 12 of first reverse osmosis unit 10. However, pH adjustment may be carried out as necessary or advantageous. In the present invention, a second permeate is removed from low pressure side 22 of reverse osmosis unit 18 along line 24. Retentate from reverse osmosis unit 18 can be removed along line 17 to feedwater line 2 as indicated.

In the present invention, the second permeate is transferred along line 24 by pump 23 to high pressure side 26 of third reverse osmosis unit 28. Retentate from high pressure side 26 can be removed along line 36 and either discarded or returned to line 2, 14 or 24. A third permeate or high purity product water is produced or permeated into low pressure side 38 and removed along line 44.

In the present invention, preferably first reverse osmosis unit 10 and second reverse osmosis unit 18 are operated to produce a second permeate from second reverse osmosis unit 18 having a pH of less than 6.2 and a resistivity in the range of 0.5 to 2.5 megohm-cm. Further, preferably third reverse osmosis unit 28 is operated to produce a high purity water product having a resistivity in the range of 5 to 18 megohm-cm, and further preferably in the range of 10 to 18 megohm-cm.

It should be noted that different combinations of membranes can be used in the triple pass reverse osmosis systems of the present invention, depending to some extent on the materials desired to be removed at each step. Further, improved quality of water is obtained if membranes are selected for each pass whose operating characteristics, such as salt rejection at high and low pH, optimum and allowable range of operating pH, are matched to the removal of material desired in each pass, and the actual dissolved materials in each pass. This is particularly important in the third pass at low feed TDS. In one embodiment of the invention, the membranes selected for membrane modules 10 and 18 are preferably spirally wound, negatively charged low pressure, interfacially cast fully aromatic, polyamide membranes, while membrane selected for module 28, although also of polyamide and interfacially cast, is preferably a positively charged membrane. The negative and positive charges on these membranes are derived from carboxyl and amine groups, respectively. Negatively charged membranes are available from Fluid Systems Corporation, under the designation HRRX, and positively charged membranes from Toray Industries Inc., under the trademark Romembra® and designation SU900.

The triple pass reverse osmosis system, however, may be configured using a wide variety of membrane configurations and chemistries. Other membrane configurations may be used, such as hollow fiber, with inside-out or outside-in flow, plate and frame or tubular. Other chemistries which may be used in one or more passes include neutral and asymmetric membranes, such as cellulose acetate, cellulose triacetate, and cellulosic blends. Other neutral polymers that may be used include strongly and weakly charged membranes other than polyamides. Cellulose acetate blend membranes are available from Fluid Systems Inc. under the trademark ROGA®, having the designation 4221FR. An example of an interfacially cast membrane based on polysulonated polyethersulfone is made by Acumem, Inc. under the trademark Acumem® DPOU.

Cellulose acetate membranes are somewhat restricted in their use due to a limited range of pH, with a maximum recommended operating pH of 6.0, and preferably 5.7. At higher pH, membrane hydrolysis will be accelerated. When a cellulose acetate membrane is used in first pass service, pH in the first pass may range from 5 to 6. Other neutral membranes can also be used in the final pass; however, such membranes must be inert to water at about pH 7. Membranes with neutral chemistries are preferred for the third pass because such a membrane will give balanced rejection of fixed anions and cations. Negatively and positively charged membranes may be used in the third pass but will preferentially reject fixed anions and cations, respectively.

Negatively charged membranes preferentially reject fixed anions (e.g., $Cl^-$ and $SO^{-4}$) in the feedwater, while positively charged membranes preferably reject fixed cations (such as $Na^+$, $Ca^{++}$). However, the differences in rejection for ions of the same valence and hydrated ionic radius is usually small, by comparison with overall rejection. Furthermore, such differences may not be significant, for product water end uses in which the major quality requirement is high resistivity. The important requirement for third pass service is good rejection, at low TDS levels, of those monovalent species ($Na^+$, $K^+$, $Cl^-$), which are most abundant in third pass feedwater, and of bicarbonate/carbonate species, if present. Rejection of weakly aceidic anions, such as silicates, is desirable but not essential, since these species can also be rejected in the preceding passes, using different membranes and operating conditions.

In one embodiment of the present invention, the first and second membranes can be neutral (no charge) membranes followed by a third membrane either positively or negatively charged, depending to some extent on the water being purified.

When a neutral membrane is used which is resistant to acid or base material, the pH to the first pass can range from 4.5 to 10.5.

The first permeate is used as feed for second reverse osmosis 18. The purpose of first and second reverse osmosis systems is to reduce the alkalinity and TDS to a low level. The second permeate produced at low pressure side 22 preferably has a pH of less than 6.2, an alkalinity of less than 0.2 mg/l expressed in terms of $CaCO_3$ and a resistivity in the range of 0.5 to 2.5 megohm-cm. Further, preferably, gases which dissolve to form acidic or basic ionized species should be essentially absent in free form in the feed to the third pass because such gases otherwise pass freely through the third membrane and adversely affect product resistivity. If such gases are present, they can be removed by any suitable means such as pH change or by a high efficiency degassing step. These conditions are important in order to consistently produce a high purity water product from third reverse osmosis 28, for example, having a resistivity in the range of 10 to 18 megohm-cm.

As noted earlier, the permeate from second reverse osmosis 18 is directed to third reverse osmosis 28. In the present invention, regardless of the membranes used in the first and second reverse osmosis modules, for example, two neutral membranes, it is preferred that third reverse osmosis membrane in module 28 be selected from a positively charged membrane and a negatively charged membrane. The third membrane can also be neutral, but cellulose acetate only produces a product water typically having a resistivity of less than 10 megohm-cm. When a positively or negatively charged membrane is used in the third reverse osmosis unit, the pH of the second permeate is adjusted upwardly to a pH in the range of 6.2 to 8.5 to provide an adjusted second permeate for use as a feed to the third reverse osmosis unit. When the third reverse osmosis unit utilizes a positively charged membrane, then the pH of the second permeate is adjusted to a pH in the range of 7 to 8.5, preferably 7.5 to 8.5 to ionize remaining carbon dioxide gas to produce bicarbonate ion ($HCO_3^-$) which is efficiently rejected by the positively charged membranes. The pH of the second permeate can be adjusted using any hydroxide material; however, sodium hydroxide is preferred. An electrolytic half-cell may also be used. This has the advantage that no additional fixed anion or cation is introduced when a half-cell is used to adjust the pH upwardly or downwardly. This process can efficiently produce high purity product water having a resistivity in the range of 10 to 18 megohm-cm and a pH in the range of 6.8 to 7.2, typically at a pH of about 7. Positively charged membranes suitable in this invention are described in U.S. Pat. No. 5,178,766, incorporated herein by reference.

If neutral membranes are used in the first and second pass along with a negatively charged membrane in the third pass, then it is preferred to subject the second permeate to additional treatment steps prior to introducing it to the third reverse osmosis unit. That is, the second permeate is treated to lower the pH to a pH of less than about 4.5 to provide an acidic solution having molecular carbon dioxide. The acidic solution is then subjected to a degassing step to remove the carbon dioxide to provide a degassed liquid. The degassing may be performed as described herein with respect to FIG. 2, for example. In the degassing step, it is important to reduce the carbon dioxide to a very low level, for example, less than 500 parts per billion (ppb). After the degassing step, the pH of the second permeate is adjusted to a pH of at least 6.5, preferably to a pH in the range of 7 to 8.5 The pH may be adjusted by adding sodium hydroxide. After degassing and pH adjustment, the second permeate is introduced to high pressure side 26 of third reverse osmosis unit 28 and high purity water is permeated through a negatively charged membrane into low pressure side 38. This system is capable of producing high purity water having a resistivity in the range of 10 to 18 megohm-cm. Typically, the pH of the high purity product water is in the range of 6.8 to 7.2 typically at a pH of about 7. The negatively charged membrane is particularly effective in rejecting negatively charged ions, e.g., monovalent negatively charged ions such as chloride and bicarbonate remaining in the second permeate.

In the present invention, when negatively charged membranes are used in the first and second passes, the feedwater pH can range from 8 to 11. The higher pH is particularly effective in removing silica. Further, it is preferred to maintain the first permeate at a pH in the range of 6.5 to 7.8. Also, the feedwater may be subjected to softening treatments as described herein to minimize scaling.

In another aspect of the invention, the feedwater to first reverse osmosis unit 10 may be adjusted to a pH in the range of 8.3 to 11 for purposes of ionizing weakly acidic material such as ionized forms of silica and boron which have high pKa's. The first pass typically removes substantially all strongly ionized divalent anions, such as sulphate, nitrate and cations such as calcium, barium and strontium ions, if present and most monovalent ions, such as sodium and chloride. Carbonate and bicarbonate removal is enhanced as the pH is raised. The higher pH is particularly useful in removing silica. A portion of the feedwater is passed through the membrane in reverse osmosis unit 10 and recovered as a first permeate having a pH in the range of 7 to 10, preferably 7.5 to 9.5. This first permeate is passed through second reverse osmosis unit 18 which removes additional smaller ions such as sodium and chloride. Additional bicarbonate as well as other ions are removed to provide a second permeate having a pH of less than about 6.2 and a resistivity in the range of 0.5 to 2.5 megohm-cm.

Preferably, the second permeate has an alkalinity of less than 0.2 mg/l measured as calcium carbonate. It should be noted that maintaining the feedwater and first permeate basic is particularly effective in removing alkalinity. At the higher pH silica and boron are effectively removed as well as other weakly ionized species. That is, by maintaining both the feedwater and the first permeate basic, the first and second membranes are effective in removing substantially all of the TDS and alkalinity. For example, by maintaining an alkaline pH substantially all of the TIC (total inorganic carbon) is fixed as $CO_2$, which is effectively removed. Further, removal of weakly ionized material is enhanced at an alkaline pH.

In this particular aspect of the invention, the membranes employed in reverse osmosis units 10 and 18 are preferably negatively charged membranes and the membrane employed in module 28 is preferably a positively charged membrane. As noted, such negatively charged membranes are available from Fluid Systems Inc. under the designation HRRX and the positively charged membrane is available from Toray Industries Inc. under the designation SU900.

In this particular aspect of the invention, it is preferred to subject the feedwater to an ion exchange softening step to remove scaling cations such as calcium, strontium and barium. Alternatively, the feedwater can first be subjected to nanofiltration. In addition, TDS including sodium can also be removed, depending on the membrane used and the composition of the feedwater. The second permeate is adjusted to a pH in the range of 6.2 to 8.5 before passing a portion thereof through a third reverse osmosis to provide high purity water. The membrane suitable for use in the third reverse osmosis unit may be a positively or negatively charged membrane. If a positively charged membrane is used, the pH can be adjusted to about 7.5 to 8.5. If a negatively charged membrane is used, the second permeate is acidified to a pH of less than 4.5 and degassed to remove carbon dioxide, as noted, before adjusting to a pH greater than 6.2, preferably 6.5 to 8.5, before passing through the third reverse osmosis.

In a further aspect of the invention, the feedwater to first unit 10 is adjusted to an acidic pH, preferably a pH in the range of 5 to 7 and typically 5.5 to 6.5 for purposes of rejecting ionizing materials such as ammonia and to prevent scaling resulting from calcium carbonate. The acidic pH also reduces total alkalinity by reactions that form carbon dioxide and fixed anions such as chloride and sulfate, depending on the acid used. The membrane utilized in reverse osmosis module 10 can be any membrane; however, it is preferred to use a neutral membrane or a negatively charged membrane as described herein to minimize fouling resulting from organic matter. The first pass membrane removes a significant portion of the feedwater TDS, and substantially all of the alkalinity while at the same time permitting free carbon dioxide to pass with the first pass permeate. The permeate from first reverse osmosis unit 8 is maintained in an acidic condition, and preferably maintained at a pH of less than 6 and typically at a pH in the range of 4 to 6, e.g., 5.5. The acidic pH, e.g., 5.5, provides carbon dioxide in a molecular or gaseous form which can be removed by degassing as described herein. Thus, the first permeate is subjected to a degassing step which will result in an increase in pH.

Thereafter, the degassed permeate is subject to a second reverse osmosis treatment in reverse osmosis unit 18. The degassed feed to reverse osmosis unit 18 typically has a pH in the range of 6.5 to 7 which permits removal of substantially all of the remaining alkalinity. Preferably, the membrane used in reverse osmosis unit 18 is a negatively charged membrane. Treatment in reverse osmosis unit 18 provides a second permeate having a pH of less than 6.2, preferably less than 6, and a resistivity in the range of 0.5 to 2.5 megohm-cm. The second permeate is adjusted to a pH of greater than 6.2, e.g., 6.2 to 8.5 before being used as feed to the high pressure side of third reverse osmosis module 28. The third permeate emanating from the third reverse osmosis unit provides high purity water in accordance with the invention, typically having a pH in the range of 6.8 to 7.2. Preferably, the membrane for the third reverse osmosis is either a positively or a negatively charged membrane as described herein. The feedwater used for this application wherein the feed to the first and second reverse osmosis units is maintained acidic, may be subjected to any of the water softening treatments described herein.

The presence of total alkalinity due mainly to bicarbonate, smaller amounts of carbonate and of carbon dioxide with small contributions by other ions in the feedwater is responsible for significant changes in apparent rejection of salts as determined by the conductivity of product water from a reverse osmosis system. As noted, reverse osmosis membranes are transparent to dissolved gases. Thus, carbon dioxide present in the feed side of the first pass membrane passes through the membrane to the interpass while bicarbonate and carbonate comprising total alkalinity is mostly rejected along with other anions and cations. This results in a change in the total alkalinity:$CO_2$ ratio, a loss of buffering capacity and causes a drop in pH from feed to interpass or permeate from the first membrane in a double pass reverse osmosis system. The same process is repeated from the interpass to the second pass product, for example. The resulting change in the interpass pH can have the result of moving the interpass pH away from the pH which results in high resistivity product water from the second pass reverse osmosis unit. Thus, setting the pH of the feedwater to a multi-pass reverse osmosis system does not always result in high resistivity product water.

In addition, when a particular pH is chosen for producing high resistivity water from a particular feedwater, changes in the feedwater composition, e.g., alkalinity, can render the chosen pH not optimum. Thus, lower quality product water results even though the feedwater has been maintained within a narrow pH range which was, at one time, thought to be optimum. Further, it will be appreciated that different membranes have the capacity to reject different ions to a lesser or greater extent. That is, some membranes reject fixed anions better than cations and vice versa. When there is preferential rejection, there can be leakage of the other or opposite ion. At low TDS, pH of the feedwater has a large impact on the capacity of the particular membrane to reject the particular anion or cation. However, any charged membrane's performance can vary in a systematic way with pH to reach a peak value for rejection, and thereafter its performance declines on either side of an optimum pH.

Figure 3:
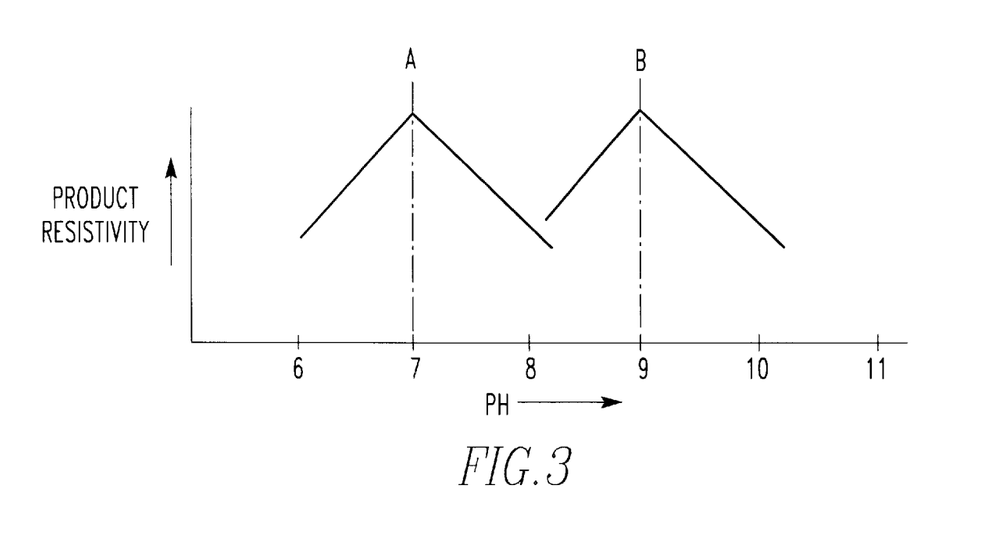
FIG. 3 is a schematic illustrating that different pH values can produce equivalent resistivity product water from different membranes, and that product resistivity is a function of feed pH and low alkalinity low TDS (total dissolved solids) feed.

This concept is illustrated in FIG. 3 where A and B denote the highest resistivity for a given pH value. However, on either side of the peak resistivity value, resistivity declines with rising or falling pH. FIG. 3 also illustrates that different pH values can result in the same quality product water. However, on either side of the pH value, product quality declines. A can represent first pass feed pH for low alkalinity/low TDS feedwater and B can represent first pass feedwater pH for higher alkalinity/TDS. A can also represent the optimum pH for a typical negatively charged conventional polyamide membrane, whilst B represents the optimum for another type of membrane. The negatively charged membrane of Fluid Systems Inc., referred to by the tradename HRRX membrane, operates in a pH range of 6.5 to 8 with a 99.4% rejection, while Toray's positively charged membrane, having the designation SU910S, operates at a pH of 9 to 9.5 with a 99.5% rejection. The lower pH is better for removing ammonia and the higher pH is better for removing carbon dioxide.

For purposes of producing high purity or high resistivity water, a resistivity monitor 30 is placed in line 44 to monitor the quality of the water leaving or emanating as permeate from third reverse osmosis unit 28 and the resistivity of the water is measured. The resistivity measurement is then relayed to a programmable logic controller 34 along line 32. The programmable logic controller is set up to compare the present resistivity measurement to the previous resistivity measurement. The programmable logic controller then determines whether the pH of the feedwater should remain the same or should be adjusted upwardly or downwardly to maintain or improve the resistivity of the product water. If the determination is made by programmable logic controller 34 that the pH of the feedwater should be adjusted upwardly, then a signal is sent to pH controller 40 which in turn signals for more caustic soda, for example, to be introduced from container 50 along line 52 to feedwater line 2. This adjusts the pH of the feedwater upwards as required by the resistivity measurement of the product water from reverse osmosis unit 28. A static mixer may be provided to ensure that the caustic soda is uniformly distributed in the feedwater prior to measuring the pH of feedwater by pH meter 42 and transferring feedwater to high pressure side 8 of reverse osmosis unit 10. It will be appreciated that if the system is being maintained acidic, then acid rather than caustic soda is added to the feed with the control action being similar.

It will be appreciated that programmable logic controller 34 can be programmed to calculate the amount of caustic soda to be introduced to the feedwater. If caustic soda is already being introduced, programmable logic controller 34 can be programmed to calculate the additional amount of caustic soda to be introduced to the feedwater. The pH of the feedwater can be monitored by pH meter 42 and the feedwater pH relayed to programmable logic controller 34 for determining the amount of caustic soda to be added. Continuous monitoring of feedwater pH by meter 42 provides programmable logic controller 34 with information respecting the feedwater and permits determination by programmable logic controller 34 whether feedwater pH is increasing or decreasing.

Programmable logic controller 34 can be programmed to maintain the resistivity of the product water within a given range or it can be programmed to improve the resistivity continually within the range. That is, if the last change in feedwater pH was an increase in pH of 0.1, for example, and this improved resistivity, programmable logic controller 34 can be programmed to increase the pH again. The amount of increase would normally be smaller than the previous increase in pH. This function can be continued to obtain the highest purity water. However, these values must be maintained within controlled ranges. That is, additional amounts of caustic soda can act to decrease resistivity. However, it should be understood that if the resistivity of the product water meets the desired value, no adjustment of pH would be necessary. Further, if caustic is being added, then a lesser amount is added if it is desired to lower the pH.

In operation, the programmable logic controller makes the comparison, using stored values in memory, and for example a logic table (or any other suitable control algorithm), and decides whether pH should increase or decrease, and then sends a signal to the pH controller, to raise or lower the set-point on the pH controller. The basis for resetting the set-point can be an adjustable incremental change in the set-point value. During normal operation, steps or changes of as little as 0.02 pH units can typically be used. Implementation of the change is handled by the pH controller, which can be any suitable stand-alone PID or similar controller or can also be written in programmable logic controller code.

In the subject invention, it is not just the pH of the feedwater that determines the quality of water obtained from the system. Instead, it is the pH of the feedwater and resistivity of the product water or permeate from the third reverse osmosis and its trend with time that determines or provides control for producing high purity water. Thus, for example, normally there is no need for interpass, i.e., between reverse osmosis units 10 and 18, additions of chemicals to change pH, for example, of the interpass or permeate from reverse osmosis unit 10, if the pH of the feedwater is controlled based on product water resistivity. That is, in the present invention, the pH of the feedwater is not fixed but can be moved upwardly or downwardly depending on what direction results in the highest resistivity in the product water.

In the present invention, it is important that a range of resistivity of product water be used as a set point. Further, as noted, it is important that adjustment in pH be maintained within a controlled range. That is, it is known that a pH change can increase the resistivity of product water. However, too much change in pH towards acidity or basicidity can result in poor quality or unacceptable product water. If an increase in pH results in lowering resistivity, then programmable logic controller 34 would respond to lower pH in the feedwater to determine if an increase in resistivity of the product water results. Additional changes in pH can be made in accordance with the invention until the highest resistivity is obtained within a set range. If a range of resistivity is set for product water, then the present invention can be controlled to manipulate the feedwater pH to provide the desired resistivity even with changes in pH values or composition of the initial feedwater.

The feedwater which can be purified to high levels of purity in the present invention can include surface water such as river water and water from reservoirs and lakes, for example. In many instances, it is preferred to soften the feed water prior to introducing it to the first primary reverse osmosis step. Generally, these sources of water contain magnesium, calcium, sodium, potassium, barium, aluminum and strontium cations with the magnesium and calcium usually being present at higher levels, depending on the source. Usually, ground water supplies contain calcium and magnesium as the primary cations and bicarbonate (with associated carbon dioxide) and sulfate as the primary anions. Sodium and chloride levels are usually less than 20 to 25% of the total cation and anion concentrations for ground waters.

Because of the presence of scale forming cations, such as magnesium and calcium, membrane scaling can occur in the primary reverse osmosis module 10. Thus, for purposes of the invention, it is preferred to pretreat the feedwater to remove the scale forming cations. Conventionally, such pretreatments include water softening. However, this has the disadvantage that large quantities of salt are required for regeneration of the softener. Thus, for purposes of the present invention, pretreatment of the feedwater utilizing a softening or nanofiltration membrane is also acceptable. The nanofiltration membrane operates at about ¼ to ⅓ the pressure (e.g., 60 to 120 psig) required for a reverse osmosis membrane used for purifying brackish water. Thus, nanofiltration can be used for pretreatment of the feedwater to remove scale forming precipitates, colloidal and organic material which would operate to foul the primary reverse osmosis membrane. The nanofiltration membrane is effective in removing up to about 80% of the large ionic radius ions and radicals, such as calcium, magnesium, sulfate and to a lesser extent, bicarbonate. Sodium and chloride ions, because of their small ionic radius, are not effectively removed (about 20 to 40% by nanofiltration). Thus, if caustic is used to adjust the pH of the feedwater, water softening or nanofiltration should be used to remove multivalent cations. The use of nanofiltration as a pretreatment has the advantage over conventional softening of not requiring the use of large quantities of regenerant salt or the disposal of regenerant waste solutions. Further, the use of nanofiltration as a pretreatment has the advantage that fouled nanofiltration membranes are much easier to clean when compared to conventional reverse osmosis membranes.

Nanofiltration membranes useful in the present invention are available from Filmtec, A division of Dow Chemical Company under the designation NF-40 or NF-70. Typically, nanofiltration membranes useful in the invention have a pore size in the range of 0.005 to 0.05 $\mu$m, and preferably 0.008 to 0.02 $\mu$m. In the present invention, nanofiltration is preferred for pretreatment of feedwater having a total dissolved solids of 200 ppm or greater and high percent hardness, e.g., 75% or greater, due to cations such as calcium and magnesium ions. The nanofiltration operates to remove 50 to 80% of the scale-forming precipitates. Thus, nanofiltration operates to reduce both alkalinity or dealkalize the feedwater and to reduce total dissolved solids from the feedwater.

Dealkalization enables feed and interpass pH to be maintained at a lower pH, for a given tap-water feed, than would be the case without dealkalization, and still obtain good product quality. It can be used to maintain second pass feed pH at less than 7 to facilitate rejection of ammonia, if desired. Partial dealkalization can be used for purposes of limiting the upper value of the feed pH control setting and thereby the resulting interpass and product pH and product water alkalinity, particularly in tap-water feeds whose alkalinity tends to be high, or whose alkalinity rises seasonally above a baseline value.

Also, an activated carbon pretreatment may be provided to remove a portion of the naturally occurring materials and residual disinfectant such as chlorine and chloramine compounds which result from the addition of ammonia to water to reduce high trihalomethane levels resulting from chlorination and the reaction of chlorine with organics such as humic acid. Breaking down chlorine compounds may give rise to ammonia in the water. Ammonia can be removed in a separate pretreatment step, or one or more of the passes in the triple pass reverse osmosis operated at a pH below 7.0 to ensure rejection of ammonium ions. Another suitable method of removing ammonia is the use of the zeolite "clinoptilolite", following a softening step for removal of calcium, which is preferentially removed by this resin. Exhausted zeolite can be regenerated with an alkaline sodium chloride solution.

In another method of removing chloramine, sodium bisulfite may be added to the feedwater for purposes of removing chlorine. That is, sodium bisulfite acts to break down chloramine to chloride and ammonia gas. The chloride ion is rejected by the reverse osmosis membrane. The ammonia gas becomes ionized in the pH range below 7 and will be rejected by the reverse osmosis membrane. Thus, in some instances it is preferred that at least one interpass permeate be maintained at a pH in the range below 7 in order that the reverse osmosis unit 18 can remove the ammonium ion. The interpass permeate can be maintained at a lower pH, e.g., 6 to 7, by selecting a first pass membrane (reverse osmosis unit 10) that has a high salt rejection which operates to reduce alkalinity to a greater extent in the first pass while still allowing passage of carbon dioxide. This results in a lower pH for the interpass permeate. Also, if the feedwater is partially dealkalized, the pH of the feedwater entering reverse osmosis unit 10 can be lower resulting, in some instances, in a lower pH for the interpass permeate.

Direct adjustment of interpass pH by addition of acid or caustic can be used, but this has the disadvantage of causing final product resistivity to be higher and results in an operationally more complex system.

Figure 2:
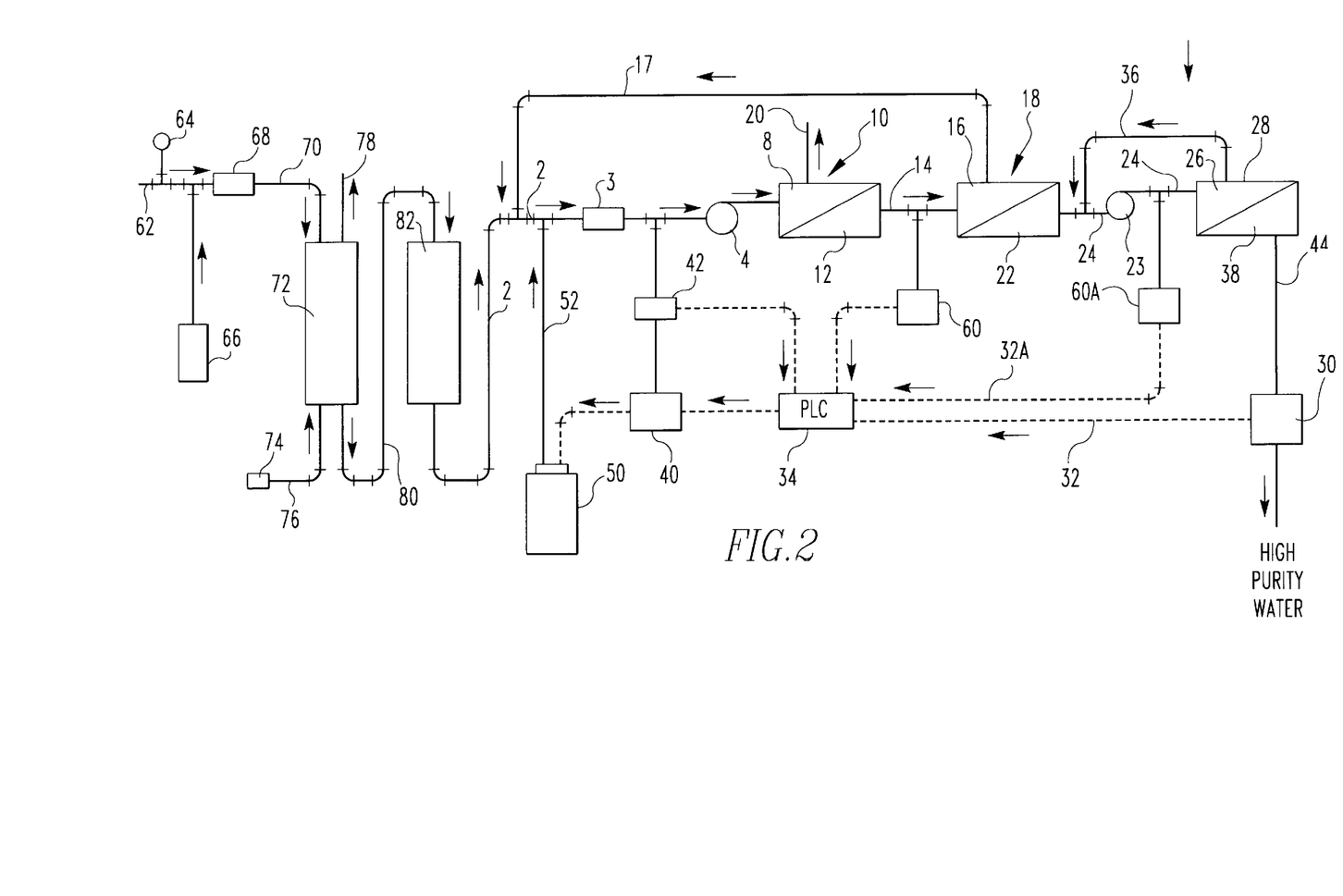
FIG. 2 shows a schematic illustrating pretreatment of the feedwater coupled with triple pass reverse osmosis treatments.

In FIG. 2 there is shown a schematic illustrating the process of dealkalizing, degassing and/or softening the feedwater prior to pH adjusting for introducing to first reverse osmosis unit 10. Feedwater is introduced at line 62 and an alkalinity monitor 64 is provided to determine the total alkalinity of the feedwater. A signal is relayed from alkalinity monitor to acid tank 66 which injects a controlled amount of acid, e.g., sulfuric acid, to lower the total alkalinity of the feedwater. Typically, the feedwater should be partially dealkalized when alkalinity is greater than 200 mg/l based on $CaCO_3$ to levels of 30 to 60 mg/l. After the injection of acid, a mixer 68 disperses the acid in the feedwater.

The dealkalized feedwater is conveyed along line 70 to degassing station or unit 72 for removing carbon dioxide. The feedwater is degassed by providing a vacuum on one side of a microporous, hydrophobic membrane such as is available from Hoechst-Celanese Corp. under the trademark Liqui-Cel®. The degassing may be accomplished using a vacuum and a gas purge of nitrogen or by an air sweep at atmospheric pressure. In degassing unit 72, 80% and preferably 90% of the free carbon dioxide is removed. The vacuum is obtained by blowing air, using blower 74, through line 76. The air exits along line 78. Degassed feedwater is removed along line 80 to water softener 82. The pH of the feedwater can be lowered prior to its entering degassing unit 72 to favor removal of carbon dioxide gas. pH of feedwater in the range of 8 to 10 is useful for the present invention. It should be understood that degassing unit 72 may be used between reverse osmosis units 10 and 18 or between reverse osmosis units 18 and 28, as noted earlier.

Nitrogen purge gas should be used, since otherwise the progressively purer water will be contaminated by the carbon dioxide in stripping air. Operating under vacuum will minimize the amount of nitrogen needed.

After water softener 82, the pretreated feedwater is introduced along line 2 to static mixer 3 and pump 4, as noted earlier, before being introduced to reverse osmosis unit 10.

In the present invention, alkalinity in the feedwater resulting from bicarbonate, carbonate and minor amounts of other ions as well as carbon dioxide significantly affect rejection of salts and thus the level of conductivity or resistivity of the product water from a triple pass reverse osmosis system. The presence of alkalinity and carbon dioxide result in poorer quality product water than would normally be predicted from rejection of sodium chloride only. Dissolved gases such as carbon dioxide pass through a reverse osmosis membrane while most of the alkaline material is rejected. This causes a drop in the pH of permeate from the first reverse osmosis by changing the alkalinity:carbon dioxide ratio. Thus, it will be seen that such change in pH in respect of interpass permeate may not be optimum for production of product water having a high resistivity. However, by monitoring product water resistivity in accordance with the invention, the feedwater can be adjusted to provide a feed or an interpass permeate having a pH in the range of 6 to 7.5 which permits production of product water having high resistivity. That is, at a pH in the range of 6 to 7, any ammonia gas becomes ionized and is easily rejected in reverse osmosis unit 18. Thus, it is preferred to adjust the pH of the interpass permeate by adjusting the alkalinity of the feedwater. The interpass permeate can be degassed or treated with acid to ionize ammonia gas for rejection in the next pass. The interpass permeate pH can be adjusted also with alkali or base material, buffer, a natural or synthetic material such as resin or zeolite, an electro or electrochemical ion exchange process. Also, the interpass permeate can be degassed using a hydrophobic membrane where a vacuum is provided on one side to remove gases through the membrane.

In the present invention, preferably the pH of the feedwater to reverse osmosis 10 is maintained in the range of 8 to 11 with a preferred range being about 8 to 9.5. As noted, the pH of the feedwater can be adjusted by injecting a solution of caustic material from tank 50 along line 52 into line 2. This level of pH has the effect of ionizing residual carbon dioxide to facilitate its remove in first pass reverse osmosis 10.

In the present invention, the resistivity of product water may be used to determine the range of pH of the feedwater which may be moved up or down depending on resistivity and direction by the programmable logic controller.

While caustic soda has been noted for pH adjustment, it will be appreciated that other bases that may be used include potassium hydroxide, sodium bicarbonate and sodium carbonate.

After the pH of the pretreated feedwater is adjusted, it is introduced to high pressure side 8 of reverse osmosis 10 where ionized material, such as sodium, chloride, sulfate, bicarbonate and silica, as well as other ions, are rejected and removed along line 10. As noted earlier, the alkalinity:carbon dioxide ratio is changed in reverse osmosis 10, and this causes a drop in pH for the interpass permeate. Thus, it is important that the pH of the interpass permeate is changed in the direction desired for optimum resistivity of product water. When the pH of the feed to a particular reverse osmosis unit is matched with the membrane used, this provides for the production of high purity water. Thus, in such cases, addition can be made to the interpasses to adjust the feed to the desired pH level for rejection by the membrane.

Suitable membranes that can be utilized in reverse osmosis units 10 and 18 are available from Fluid Systems Inc. under the designation HRRX.

In another aspect of the invention, it has been found that it can be advantageous to monitor pH of the interpass permeates between reverse osmosis units 10 and 18 or between 18 and 28 as well as or instead of the resistivity of the product water. That is, if the composition of the feedwater changes quickly, measuring resistivity of the product water in some cases may not be sufficiently responsive to ensure continued production of high quality product water. When the composition of the feedwater changes quickly, measuring pH of intelpass permeate permits a faster response time for changing feedwater pH for introduction to reverse osmosis unit 10. This, in turn, permits continued production of high quality or resistivity product water. The pH of interpass permeate can be determined by pH monitor 60 (FIG. 1) or 60A (FIG. 2). The interpass permeate pH can be relayed to programmable logic controller 34 which in turn determines the necessary change in feedwater pH as noted earlier with respect to product water resistivity. In this way, programmable logic controller 34 can be more responsive to changes in feedwater composition changes.

The pH control function for the interpass permeate can be located within the programmable logic controller as code or it can be provided as a separate instrument.

The pH measurement of the interpass permeates can be difficult because the water has low conductivity (e.g., 10–30 micro-S-cm) and the pressure of the interpass is variable. Thus, a bleed off stream can be used which avoids contaminating the water. Also, a pressure-compensated pH reference electrode probe holder can be used. The pH measurement of the interpass permeate can either be an absolute pH value or it can be a change in pH to indicate the direction of change of the pH as the interpass permeate flows past the electrode. Alternatively, flow can be stopped in the bleed line and absolute values of pH obtained.

While reverse osmosis units 10, 20 and 28 have been shown as single units, they can be comprised of multiple units in series or parallel with the retentate of the later reverse osmosis transferred back to feed of an earlier reverse osmosis unit.

Thus, in the present invention, product water resistivity is monitored and used to reset the set-point of a feedwater pH controller to increase or decrease pH of feedwater introduced to reverse osmosis unit 10. As noted, this changes the interpass permeate pH. Further, as explained, performance of both reverse osmosis units 10, 20 and 28 changes with changes in feedwater composition. The first pass through reverse osmosis unit 10 changes in a complex manner. Thus, the present invention can be set up to adjust the composition of the feedwater in response to the resistivity of the second pass permeate or the product water leaving reverse osmosis unit 28. For example, feedwater pH is increased or decreased at discrete intervals in the direction which results in highest resistivity product water.

This process has the advantage that it can be fully automated. This results in less operator attention being required and in a more consistent quality of product water.

While the invention has been described with respect to an automated control system, it will be appreciated that the system can be operated on a semiautomated mode. That is, the pH of the feedwater can be adjusted manually in response to electrical resistance measurements of the product water. Such semi-automated mode is contemplated within the scope of the invention.

EXAMPLE 1

Figure 4:
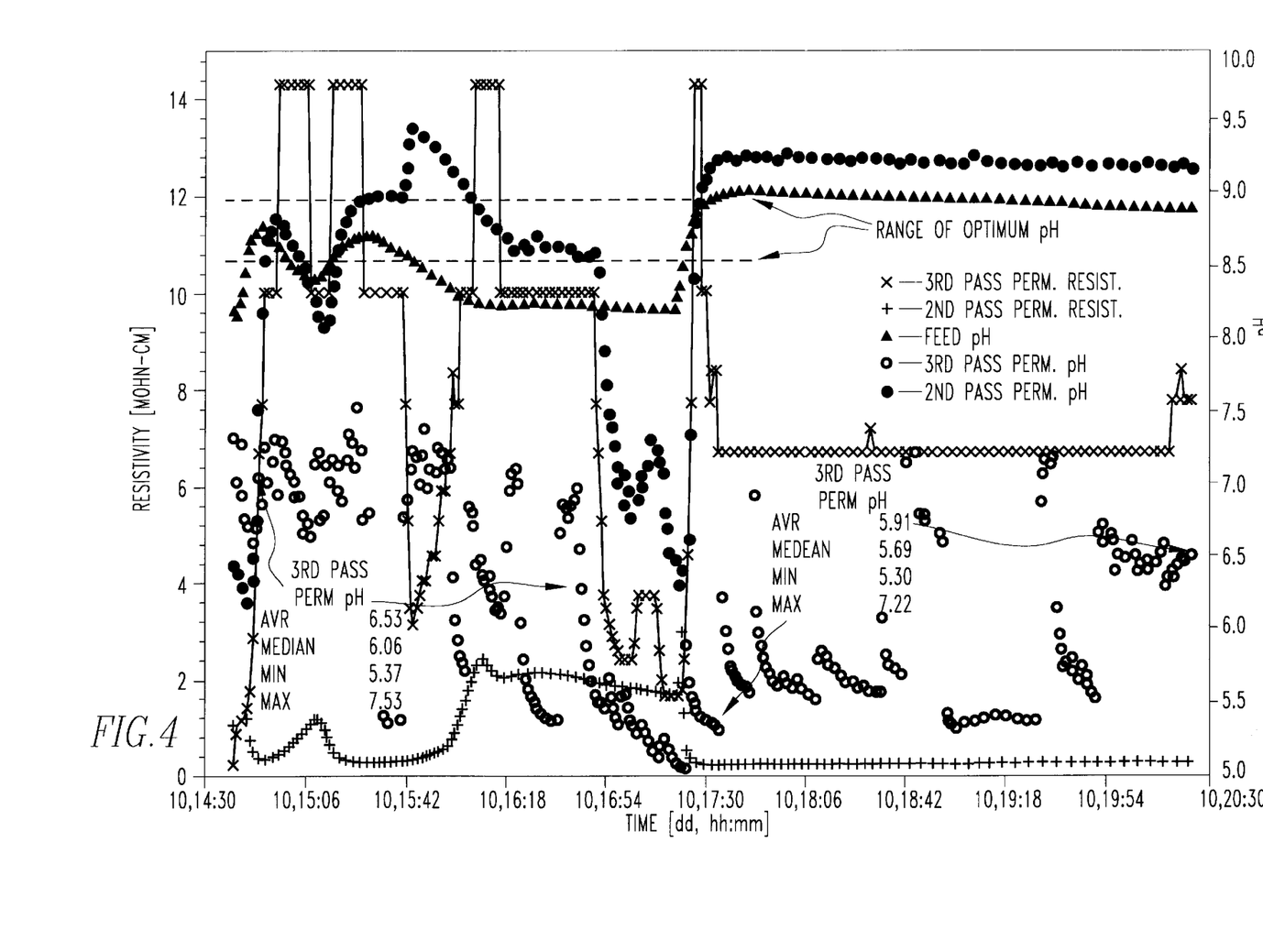
FIG. 4 shows that product water having a resistivity ranging from about 10 to 14 megohm-cm can be produced on a continuous basis using the triple pass reverse osmosis system of the invention which changes feed pH in response to product water resistivity.

Tap water was purified continuously in a triple pass reverse osmosis system substantially as shown in FIG. 1. The feedwater had a conductivity of 300 micro-S-cm, a total alkalinity (as $CaCO_3$) of 89, and a pH of 7.9 with a total hardness (as $CaCO_3$) of 92 mg/l. The tap water feed was pretreated by softening, dechlorinated by passing through granular activated carbon, and subjected to a 5 micron cartridge filtration step, prior to adjusting to a pH of 8.1 The reverse osmosis unit utilized negatively charged polyamide, spirally wound elements. The recirculating feed to the first reverse osmosis unit had a conductivity of 450 micro-S-cm, total alkalinity (as $CaCO_3$) of about 140 mg/l and a total hardness of <1 mg/l after stabilized flow was established. First pass permeate pH was in the range of 7.5–8.0. The first pass permeate was used as feed to the second reverse osmosis unit, which also utilized negatively charged polyamide, spirally wound elements. After passing through the second reverse osmosis unit, the second permeate had a conductivity of 0.5 to 2 megohm-cm, a pH of about 6.2, and an alkalinity level of <1 mg/l (as $CaCO_3$). The second permeate was directed to a third reverse osmosis unit, which used a positively charged membrane. The membrane was operated at a recovery of 50% at 25° C. It will be seen from FIG. 4 that the best product quality was obtained at a recirculating feed pH range of 8.5–8.9.

The data shows that the resistivity of second pass permeate could vary, and good quality water could still be obtained. The high purity water or third pass permeate had a total inorganic carbon (TIC) level of about 6 ppb, and the second pass permeate had a TIC of about 20 ppb. Thus, the third pass was effective in reducing TIC. It can also be seen that it is important to match the feed pH to the particular membrane selected. High purity water was obtained despite the fact that the single reverse osmosis module used in the third pass was operated at a recovery higher than recommended, indicating that further improvement is possible.

Figure 5:
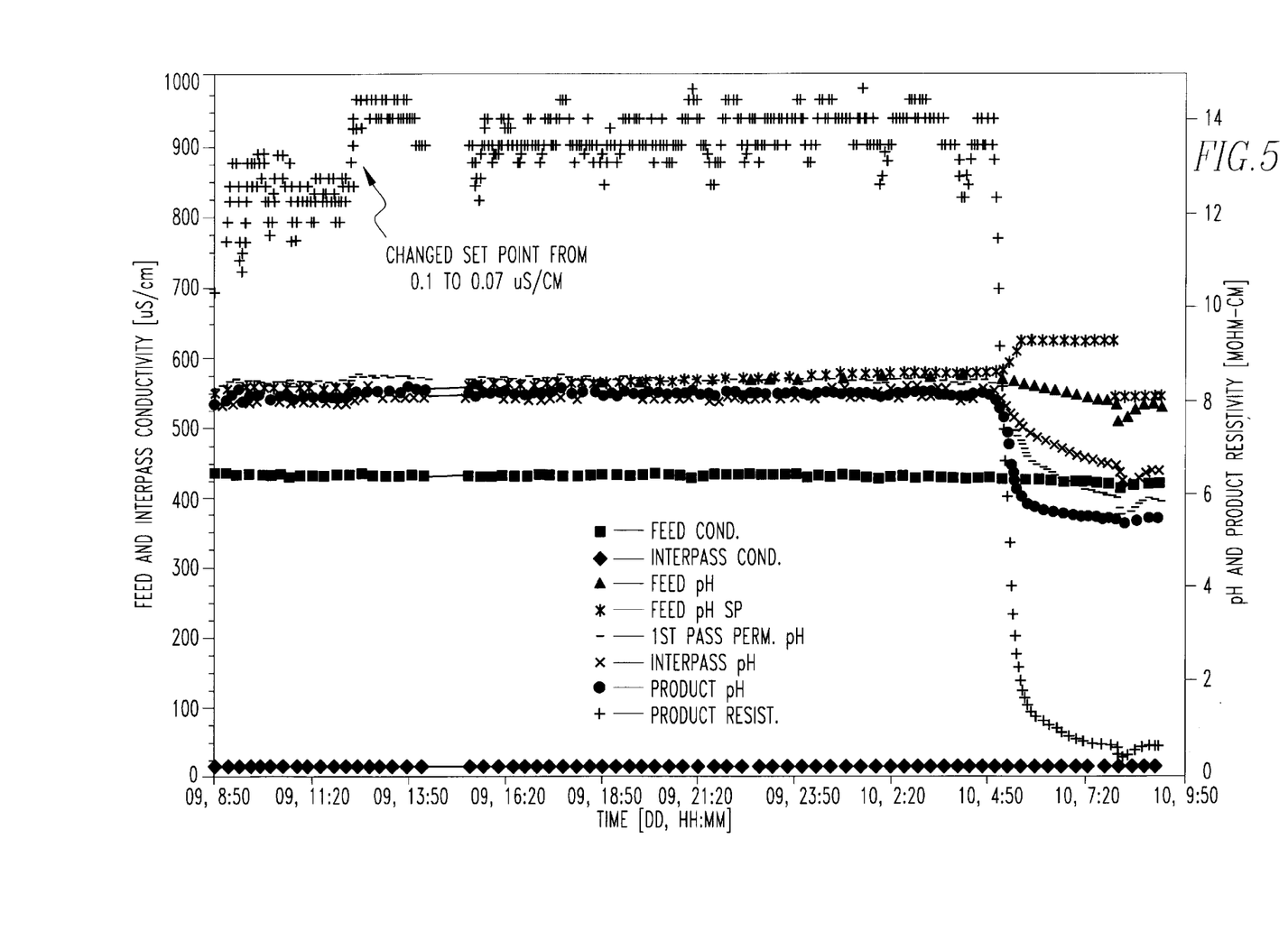
FIG. 5 shows data taken from the triple pass reverse osmosis after pH control was set up in automatic mode.

FIG. 5 shows further data taken after the pH control was set up in fully automatic mode, and fine tuned. This data shows that 13 megohm-cm water could be obtained from the same feed.

EXAMPLE 2

This example is the same as Example 1, except a non-charged polyamide membrane was used in the third pass reverse osmosis unit.

The pH of feed to the third pass was progressively raised, stabilized then lowered over a two-hour period.

The third pass product quality at first rose and peaked at 3 megohm-cm. This corresponds to a feed pH to the third pass of 7.6. When feed pH was raised further, product quality declined sharply and remained low. When the feed pH was again lowered, quality again improved briefly, but did not achieve the previous high value because the declining feed pH was soon below the optimum.

The 3 megohm-cm water obtained is only slightly better than can be obtained with two passes. Although this membrane has a nominal salt rejection slightly lower than the membrane used in Example 1 (99.0% minimum versus 99.5% minimum), the difference does not seem to account for the difference in performance.

This example illustrates that a conventional polyamide membrane, when used in the third pass does not achieve results comparable with the positively charged membrane of Example 1, where optimum pH is close to 9. The lower resistivity resulting from the use of a non-charged polyamide membrane is explained by the fact that at low operating pH ($\leq 8.3$) carbon dioxide is present in second pass product. Carbon dioxide in second pass product passes to the third pass product, depressing pH and raising the conductivity. Bicarbonate passing through the third pass membrane enters into a lower pH environment on the permeate side splitting further to carbon dioxide depressing pH and raising conductivity.

At a pH of about 7.6 and above, salt rejection of the membrane falls, more fixed ions pass through the membrane, and conductivity is again increased.

EXAMPLE 3

This example is the same as Example 2 except that a dealkalizing and degassing system was used between the second and third passes. In the dealkalization/degassing step, the second permeate was maintained at a pH of about 4 and then passed over a membrane under vacuum on the opposite side. A nitrogen sweep was provided in the vacuum side to aid removal of gas. The degassed liquid was introduced to the third pass reverse osmosis module. The third pass permeate had a resistivity of 10.8 megohm-cm at a pH of 7. It will be seen that the dealkalization/degassing step resulted in higher purity product water when compared to Example 2.

The triple pass reverse osmosis system has the advantage that it allows three stages of demineralizing (from roughing to polishing) to be integrated into a single process train. This minimizes the use of chemicals and allows greater tolerance in the design, operation and control of the first two stages of reverse osmosis units. It enables elimination of a degassing step for the final product water which is targeted at carbon dioxide removal.

While the invention has been described in terms of preferred embodiments, the claims appended hereto are intended to encompass other embodiments which fall within the spirit of the invention.

What is claimed is:

1. A method for producing high purity product water using a three pass reverse osmosis system, the method having the ability to produce water having a resistivity in the range of 10 to 18 megohm-cm, the method comprising the steps of:
   (a) providing a feedwater to be purified, the feedwater having a pH in the range of 5.5 to 6.5;
   (b) introducing the feedwater to a high pressure side of a first reverse osmosis membrane module;
   (c) passing water through said first reverse osmosis membrane to provide a first retentate and a first permeate having a pH of less than 6;
   (d) removing $CO_2$ gas from said first permeate to provide a degassed liquid;
   (e) transferring said degassed liquid to a high pressure side of a second reverse osmosis membrane module;
   (f) further purifying said degassed liquid by passing at least a portion thereof through said second reverse osmosis membrane to provide a second retentate and a second permeate having a pH of less than about 6.2;
   (g) adjusting said second permeate to a pH of greater than 6.2 to provide an adjusted second permeate;
   (h) providing a third pass reverse osmosis module having a third high pressure side and a third low pressure side;
   (i) introducing said adjusted second permeate to the high pressure side of said third pass reverse osmosis module; and
   (j) passing at least a portion of said adjusted second permeate through said third pass reverse osmosis membrane to permeate high purity product water having a pH in the range of 6.8 to 7.2.

2. The method in accordance with claim 1 including adjusting said second permeate to a pH in the range of 6.2 to 8.5.

3. The method in accordance with claim 1 including adjusting the pH of the second permeate to a pH in the range of 6.2 to 7.

4. The method in accordance with claim 1 including the step of subjecting said feedwater to a filtration step selected from microfiltration and nanofiltration.

5. The method in accordance with claim 1 including adjusting said pH of said second permeate by adding a hydroxide material.

6. The method in accordance with claim 1 including softening said feedwater.

7. A method for producing high purity product water using a three pass reverse osmosis system, the method having the ability to produce water having a resistivity in the range of 10 to 18 megohm-cm, the method comprising the steps of:
(a) providing a feedwater to be purified, the feedwater having a pH in the range of 5.5 to 6.5;
(b) introducing the feedwater to a high pressure side of a first reverse osmosis membrane module;
(c) passing water through said first reverse osmosis membrane to provide a first retentate and a first permeate;
(d) adjusting said first permeate to a pH of less than 4.5 to provide an acidic solution having molecular $CO_2$;
(e) subjecting said acidic solution to a degassing step to remove molecular $CO_2$ to provide a degassed liquid;
(f) raising the pH of said degassed liquid to a pH in the range of 5.5 to 6.5 to provide an adjusted degassed liquid;
(g) transferring said adjusted degassed liquid to a high pressure side of a second reverse osmosis membrane module;
(h) further purifying said adjusted degassed liquid by passing at least a portion thereof through said second reverse osmosis membrane to provide a second retentate and a second permeate having a pH of less than 6.2 and a resistivity in the range of 0.5 to 2.5 megohm-cm;
(i) adjusting said second permeate to a pH of greater than 6.2 to provide an adjusted second permeate;
(j) providing a third pass reverse osmosis module having a third high pressure side and a third low pressure side;
(k) introducing said adjusted second permeate to the high pressure side of said third pass reverse osmosis module; and
(l) passing at least a portion of said adjusted second permeate through said third pass reverse osmosis membrane to permeate high purity product water having a pH in the range of 6.8 to 7.2.

8. The method in accordance with claim 7 including adjusting said second permeate to a pH in the range of 6 to 8.5.

9. The method in accordance with claim 7 including adjusting said second permeate to a pH in the range of 6 to 7.

10. The method in accordance with claim 7 including the step of subjecting said feedwater to a filtration step selected from microfiltration and nanofiltration.

11. The method in accordance with claim 7 including adjusting said pH of said second permeate by adding a hydroxide material.

12. A method for producing high purity product water using a three pass reverse osmosis system, the method having the ability to produce water having a resistivity in the range of 10 to 18 megohm-cm, the method comprising the steps of:
(a) providing a feedwater to be purified, the feedwater having a pH in the range of 5.5 to 6.5;
(b) introducing the feedwater to a high pressure side of a first reverse osmosis membrane module;
(c) passing water through said first reverse osmosis membrane to provide a first retentate and a first permeate;
(d) removing $CO_2$ gas from said first permeate to provide a degassed liquid;
(e) transferring said degassed liquid to a high pressure side of a second reverse osmosis membrane module;
(f) further purifying said degassed liquid by passing at least a portion thereof through said second reverse osmosis membrane to provide a second retentate and a second permeate having a pH of less than about 6.2 and resistivity in the range of 0.5 to 2.5 megohm-cm;
(g) adjusting said second permeate to a pH of greater than 6.2 to provide an adjusted second permeate;
(h) providing a third pass reverse osmosis membrane having a third high pressure side and a third low pressure side;
(i) introducing said adjusted second permeate to the high pressure side of said third pass reverse osmosis membrane;
(j) passing at least a portion of said adjusted second permeate through said third pass reverse osmosis membrane to produce said high purity product water having a pH in the range of 6.8 to 7.2;
(k) measuring the resistance of the high purity product water produced to provide a resistance measurement;
(l) relaying said resistance measurement to a programmable logic controller;
(m) in said programmable controller, comparing said resistance measurement with a previous resistance measurement to provide a comparison; and
(n) in response to said comparison, maintaining or changing the pH of at least one of said degassed liquid, said feedwater, said first permeate and said second permeate upwardly or downwardly to produce said high purity water having said desired resistivity.

13. The method in accordance with claim 12 including adjusting said second permeate to a pH in the range of 6.2 to 8.5.

14. The method in accordance with claim 12 including adjusting the pH of the second permeate to a pH in the range of 6 to 7.

15. The method in accordance with claim 12 including the step of subjecting said feedwater to a filtration step selected from microfiltration and nanofiltration.

16. A method for producing high purity product water using a three pass reverse osmosis system, the method having the ability to produce water having a resistivity in the range of 10 to 18 megohm-cm, the method comprising the steps of:
(a) providing a feedwater to be purified, the feedwater having a pH in the range of 5.5 to 6.5;
(b) introducing the feedwater to a high pressure side of a first reverse osmosis membrane module;
(c) passing water through said first reverse osmosis membrane to provide a first retentate and a first permeate;
(d) adjusting said first permeate to a pH of less than 4.5 to provide an acidic solution having molecular $CO_2$;
(e) subjecting said acidic solution to a degassing step to remove molecular $CO_2$ to provide a degassed liquid;
(f) adjusting said degassed liquid to a pH in the range of 5.5 to 6.5 to provide an adjusted degassed liquid;
(g) transferring said adjusted degassed liquid to a high pressure side of a second reverse osmosis membrane module;
(h) further purifying said adjusted degassed liquid by passing at least a portion thereof through said second reverse osmosis membrane to provide a second reten tate and a second permeate having a pH of less than 6.2 and a resistivity in the range of 0.5 to 2.5 megohm-cm;

(i) adjusting said second permeate to a pH of greater than 6.2 to provide an adjusted second permeate;

(j) providing a third pass reverse osmosis module having a third high pressure side and a third low pressure side;

(k) introducing said adjusted second permeate to the high pressure side of said third pass reverse osmosis module;

(l) passing at least a portion of said adjusted second permeate through said third pass reverse osmosis membrane to permeate high purity product water having a pH in the range of 6.8 to 7.2;

(m) measuring the resistance of the high purity product water produced to provide a resistance measurement;

(n) relaying said resistance measurement to a programmable logic controller;

(o) in said programmable controller, comparing said resistance measurement with a previous resistance measurement to provide a comparison; and (p) in response to said comparison, maintaining or changing the pH of at least one of said degassed liquid, said feedwater, said first permeate and said second permeate upwardly or downwardly to produce said high purity water having said desired resistivity.

17. A three pass reverse osmosis system for producing a high purity product water having a resistivity in the range of 10 to 18 megohm-cm, the method comprising the steps of:

(a) means for providing a feedwater to be purified, the feedwater having a pH in the range of 5.5 to 6.5;

(b) a first reverse osmosis membrane module having a first high pressure side and a first low pressure side separated by a first reverse osmosis membrane;

(c) means for introducing and passing said feed water through said first reverse osmosis membrane to provide a first retentate and a first permeate;

(d) a degasser in fluid communication with said first permeate for removing $CO_2$ gas from said first permeate to provide a degassed liquid;

(e) a second reverse osmosis module having a second high pressure side and a second low pressure side separated by a second reverse osmosis membrane, said second high pressure in fluid communication with said degassed liquid, said second reverse osmosis module adapted for further purifying said degassed liquid by passing at least a portion thereof through said second reverse osmosis membrane to provide a second retentate and a second permeate having a pH of less than about 6.2 and resistivity in the range of 0.5 to 2.5 megohm-cm;

(f) means for adjusting said second permeate to a pH of greater than 6.2 to provide an adjusted second permeate;

(g) a third pass reverse osmosis module having a third high pressure side and a third low pressure side separated by a third reverse osmosis membrane, said third high pressure side adapted for receiving said adjusted second permeate; and (h) means for passing at least a portion of said adjusted second permeate through said third pass reverse osmosis membrane to permeate high purity product water having a pH in the range of 6.8 to 7.2.

* * * * *